US011650600B2

(12) United States Patent
Cho et al.

(10) Patent No.: US 11,650,600 B2
(45) Date of Patent: May 16, 2023

(54) APPARATUS AND METHOD FOR CONTROLLING DRIVING OF VEHICLE

(71) Applicants: HYUNDAI MOTOR COMPANY, Seoul (KR); KIA MOTORS CORPORATION, Seoul (KR)

(72) Inventors: Jin Kyeom Cho, Suwon-si (KR); Sung Bae Jeon, Ansan-si (KR); Hui Un Son, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 491 days.

(21) Appl. No.: 16/774,285

(22) Filed: Jan. 28, 2020

(65) Prior Publication Data
US 2021/0089052 A1 Mar. 25, 2021

(30) Foreign Application Priority Data
Sep. 24, 2019 (KR) .......................... 10-2019-0117416

(51) Int. Cl.
*G05D 1/02* (2020.01)
*B60W 30/14* (2006.01)
(Continued)

(52) U.S. Cl.
CPC ......... *G05D 1/0289* (2013.01); *B60W 30/143* (2013.01); *B60W 30/165* (2013.01);
(Continued)

(58) Field of Classification Search
CPC ............. B60W 30/143; B60W 30/165; B60W 30/0953; B60W 30/0956; B60W 2554/4045; B60W 2554/802; B60W 2554/804; B60W 2754/30; B60W 30/08; B60W 30/14; B60W 30/18163; B60W 40/02; B60W 40/105; B60W 2554/80;
(Continued)

(56) References Cited

U.S. PATENT DOCUMENTS 9,771,055 B1* 9/2017 Zhang .................. G01S 15/931
2005/0267660 A1* 12/2005 Fujiwara ............... B60W 10/20
701/41

(Continued)

FOREIGN PATENT DOCUMENTS

KR 10-2013-0065109 A 6/2013
KR 10-2016-0071164 A 6/2016
KR 10-2018-0107666 A 10/2018

*Primary Examiner* — Angelina Shudy
*Assistant Examiner* — Mohamed Abdo Algehaim
(74) *Attorney, Agent, or Firm* — Lempia Summerfield Katz LLC

(57) ABSTRACT

An apparatus and method for controlling driving of a vehicle are disclosed. The disclosed method includes: determining, by a determinator, whether smart cruise driving of a vehicle is performed; determining, by the determinator, whether a rear vehicle performs a lane change when the vehicle is in a smart cruise driving state; determining, by the determinator, a collision possibility based on whether the rear vehicle performs the lane change; determining, by the determinator, whether a front vehicle is present; based on the determined collision possibility; and calculating, by a controller, a target distance or a target speed when there is a front vehicle.

16 Claims, 4 Drawing Sheets

(51) Int. Cl.
  *B60W 30/165* (2020.01)
  *G05D 1/00* (2006.01)
  *G06V 20/56* (2022.01)

(52) U.S. Cl.
  CPC ......... *G05D 1/0088* (2013.01); *G05D 1/0223* (2013.01); *G06V 20/588* (2022.01); *G05D 2201/0213* (2013.01)

(58) Field of Classification Search
  CPC .. B60W 30/085; B60W 30/09; B60W 30/095; B60W 30/16–17; B60W 60/0015–0017; B60W 60/0027–00276; B60W 2554/801; B60W 2754/20; B60W 60/00; B60W 60/007; B60Y 2300/08; B60Y 2300/14; B60Y 2300/18166; G05D 1/0289; G05D 1/0088; G05D 1/0223; G05D 2201/0213; G06V 20/588; G06V 20/58; G08G 1/16–1/168
  USPC .......................................................... 701/301
  See application file for complete search history.

(56) References Cited

U.S. PATENT DOCUMENTS

| | | | | |
|---|---|---|---|---|
| 2007/0106475 A1* | 5/2007 | Kondoh | ................. | G06V 20/58 340/436 |
| 2007/0182528 A1* | 8/2007 | Breed | ................... | B60W 30/16 348/148 |
| 2009/0248270 A1* | 10/2009 | Sekiguchi | ........... | B60W 10/184 701/96 |
| 2010/0082251 A1* | 4/2010 | Kogure | ............... | B60T 8/17558 701/301 |
| 2013/0085976 A1* | 4/2013 | Bone | ............... | B60W 30/18163 706/46 |
| 2013/0166150 A1* | 6/2013 | Han | ...................... | B60W 10/06 701/41 |
| 2015/0142299 A1* | 5/2015 | Shin | ....................... | G06V 20/58 701/301 |
| 2015/0149037 A1* | 5/2015 | Lim | ...................... | B60W 40/105 701/41 |
| 2016/0010983 A1* | 1/2016 | Hammadou | ............ | G01S 15/86 701/301 |
| 2016/0039410 A1* | 2/2016 | Kaminade | ................. | B60Q 1/46 701/1 |
| 2016/0052515 A1* | 2/2016 | Choi | .................... | B60W 40/114 701/1 |
| 2016/0240084 A1* | 8/2016 | Takeuchi | .................. | B60T 7/22 |
| 2017/0088136 A1* | 3/2017 | Seo | ........................ | B60W 30/16 |
| 2017/0153644 A1* | 6/2017 | Otsuka | ................ | B60R 16/0231 |
| 2017/0253240 A1* | 9/2017 | Kishida | ..................... | B60K 6/48 |
| 2017/0270799 A1* | 9/2017 | Takeda | ................... | B60W 30/00 |
| 2017/0278401 A1* | 9/2017 | Probert | .................. | G08G 1/167 |
| 2017/0358209 A1* | 12/2017 | Ohmori | ..................... | B60T 8/00 |
| 2017/0369062 A1* | 12/2017 | Saigusa | ................. | B60W 50/04 |
| 2017/0369067 A1* | 12/2017 | Saigusa | ................. | B60W 30/16 |
| 2018/0029533 A1* | 2/2018 | Goudy | ................... | G08G 1/166 |
| 2018/0037227 A1* | 2/2018 | D'sa | ..................... | B60W 30/16 |
| 2018/0178802 A1* | 6/2018 | Miyata | ................... | B60W 50/14 |
| 2018/0201272 A1* | 7/2018 | Takeda | ................... | B60W 30/10 |
| 2018/0354510 A1* | 12/2018 | Miyata | ................... | B60W 50/14 |
| 2019/0031190 A1* | 1/2019 | Choi | ...................... | B60W 10/18 |
| 2019/0113926 A1* | 4/2019 | Sim | ........................ | G05D 1/0214 |
| 2019/0202472 A1* | 7/2019 | Lee | ...................... | B60W 30/0956 |
| 2019/0322287 A1* | 10/2019 | Escrig-Monferrer | ........ | G05D 1/0088 |
| 2019/0351906 A1* | 11/2019 | Oh | ..................... | B60W 30/0956 |
| 2020/0039508 A1* | 2/2020 | Onishi | ................... | B60W 50/14 |
| 2021/0053560 A1* | 2/2021 | Haddad | ............... | B60W 30/0953 |
| 2021/0253095 A1* | 8/2021 | Jiang | ............... | B60W 30/18163 |

* cited by examiner

APPARATUS AND METHOD FOR CONTROLLING DRIVING OF VEHICLE

This application claims priority to and the benefit of Korean Patent Application No. 10-2019-0117416, filed on Sep. 24, 2019, the entire contents of which are hereby incorporated by reference.

FIELD

The present disclosure relates to an apparatus and method for controlling driving of a vehicle.

BACKGROUND

The statements in this section merely provide background information related to the present disclosure and may not constitute prior art.

Generally, a smart cruise controller of a vehicle is a device configured to achieve autonomous driving of a vehicle at a predetermined vehicle speed without manipulation of an accelerator pedal by a driver. Such a smart cruise controller is also simply referred to as a "cruise control system".

Such a smart cruise controller controls a vehicle speed to be maintained at a target vehicle speed when the driver sets the target vehicle speed through simple manipulation, thereby greatly reducing manipulation of an accelerator pedal by the driver, and, as such, convenience of driving may be enhanced.

Conventional smart cruise controllers, which are configured to follow a smart cruise driving speed set by a driver, are also configured to perform control to vary a vehicle speed in order to enhance vehicle efficiency. However, we have discovered that since driving speed variation by conventional smart cruise controllers is carried out without taking into consideration movement of a rear vehicle, collision of a subject vehicle with a rear vehicle approaching to the subject vehicle or a vehicle performing a lane change may not be prevented.

SUMMARY

The present disclosure provides an apparatus and method for controlling driving of a vehicle, which are capable of inhibiting or preventing occurrence of an accident caused by a vehicle performing lane change in rear of a subject vehicle during smart cruise driving of the subject vehicle, and providing, to the driver of the subject vehicle, stability coping with variation in driving environment caused by surrounding vehicles during smart cruise driving of the subject vehicle.

Additional advantages, objects, and features of the forms will be set forth in part in the description which follows and in part will become apparent to those having ordinary skill in the art upon examination of the following or may be learned from practice of the forms. The objectives and other advantages of the forms may be realized and attained by the structure particularly pointed out in the written description and claims hereof as well as the appended drawings.

To achieve these objects and other advantages and in accordance with the purpose of the forms, as embodied and broadly described herein, a method for controlling driving of a vehicle includes: determining, by a determinator, whether or not smart cruise driving of the vehicle is performed; determining, by the determinator, whether or not a rear vehicle performs a lane change when the vehicle is in a smart cruise driving state; determining, by the determinator, a collision possibility based on whether the rear vehicle performs the lane change; determining, by the determinator, whether a front vehicle is present based on the determined collision possibility; and calculating, by a controller, a target distance or a target speed when the front vehicle is present.

In one form, determining whether or not the rear vehicle may perform a lane change comprises: determining whether or not the rear vehicle travels in the same lane as the vehicle.

The method may further include: determining, by the determinator, whether or not the rear vehicle performs the lane change to a travel lane of the vehicle when the rear vehicle travels in a lane different from the travel lane of the vehicle.

In another form, determining a collision possibility may include: calculating a requirement time for prevention of collision of the vehicle with the rear vehicle; calculating a time-to-collision of the vehicle with the rear vehicle; and determining whether the requirement time for collision prevention is shorter than the time-to-collision.

In other form, calculating the time-to-collision may include: when the rear vehicle travels in the same lane as the travel lane of the vehicle, calculating the time-to-collision through the following Expression 2.

The calculating the time-to-collision may include calculating the time-to-collision through the following Expression 3 when the rear vehicle travels a lane different from the travel lane of the vehicle.

The determining whether a front vehicle is present may include: determining whether a speed of the front vehicle is lower than a predetermined smart cruise speed of the vehicle; and determining whether or not the vehicle performs a distance control with respect to the front vehicle when the speed of the front vehicle is lower than the predetermined smart cruise speed of the vehicle.

The method may further include: calculating, by the controller, a distance decrement between the vehicle and the front vehicle through the following Expression 4 when the vehicle performs the distance control with respect to the front vehicle; and calculating, by the controller, a difference between a distance between the vehicle and the front vehicle and the distance decrement as the target distance of the vehicle.

The method may further include: calculating, by the controller, a speed increment of the vehicle through the following Expression 5 when the vehicle does not perform the distance control with respect to the front vehicle; and calculating, by the controller, a sum of the speed of the vehicle and the speed increment as the target speed of the vehicle.

In another aspect of the present disclosure, an apparatus for controlling driving of a vehicle includes: a determinator configured to determine whether a vehicle driving control for the vehicle begins; and a controller configured to control the vehicle based on whether the driving control begins. In particular, the determinator includes: a smart cruise driving determinator configured to determine whether or not smart cruise driving of the vehicle is performed; a rear vehicle lane change determinator configured to determine whether or not a rear vehicle performs a lane change when the vehicle is in a smart cruise driving state; a collision possibility determinator configured to determine a collision possibility based on whether or not the rear vehicle performs the lane change; and a front vehicle presence determinator configured to determine a presence of a front vehicle based on the determined collision possibility. In another form, the controller includes: a target distance calculator configured to calculate a target distance between the vehicle and the front vehicle when the front vehicle is present; and a target speed calculator configured to calculate a target speed of the vehicle when the front vehicle is present.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
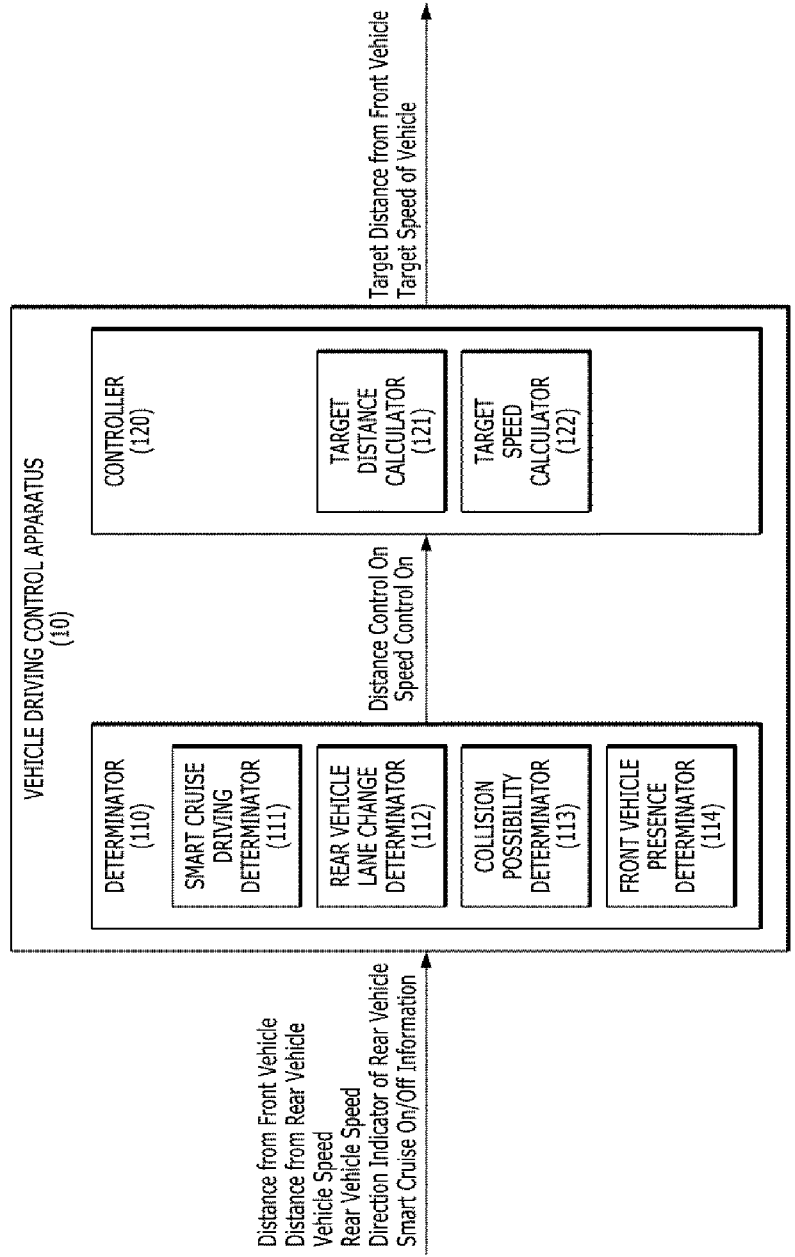
FIG. 1 is a block diagram illustrating a configuration of an apparatus for controlling driving of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various apparatuses and various methods, to which forms of the present disclosure are applied, respectively, will be described in detail with reference to the accompanying drawings. The suffixes "module" and "unit" of elements herein are used for convenience of description and thus can be used interchangeably and do not have any distinguishable meanings or functions.

In the following description of forms, it will be understood that, when an element is referred to as being formed "on" (above) or "under" (beneath) or "before" (forwardly of) or "after" (rearwardly of) another element, the two elements may contact each other directly or may be indirectly formed such that an intervening element is also present therebetween.

It will be understood that, although the terms first, second, A, B, (a), (b), etc. may be used herein to describe various elements of the present disclosure, these terms are only used to distinguish one element from another element and necessity, order, or sequence of corresponding elements are not limited by these terms. It will be understood that when one element is referred to as being "connected to", "coupled to", or "accessed by" another element, one element may be "connected to", "coupled to", or "accessed by" another element via a further element although one element may be directly connected to or directly accessed by another element.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present disclosure, such terms are not interpreted as ideal or excessively formal meanings.

FIG. 1 is a block diagram illustrating a configuration of an apparatus for controlling driving of a vehicle in accordance with one form of the present disclosure.

Referring to FIG. 1, the vehicle driving control apparatus, which is designated by reference numeral "100", may include a determinator 110 configured to determine entrance of vehicle driving control, and a controller 120 configured to perform vehicle driving control.

The determinator 110 may determine movement of a front vehicle 20 and a rear vehicle 30 based on vehicle information during smart cruise driving of a subject vehicle. Here, the vehicle information may include a distance of the subject vehicle from the front vehicle 20, a distance of the subject vehicle from the rear vehicle 30, a speed of the subject vehicle, a speed of the rear vehicle 30, direction indicator information of the rear vehicle 30, and smart cruise on/off information.

The determinator 110 may include a smart cruise driving determinator 111, a rear vehicle lane change determinator 112, a collision possibility determinator 113, and a front vehicle presence determinator 114.

The smart cruise driving determinator 111 may determine whether or not smart cruise driving is performed, based on smart cruise control on/off information.

The rear vehicle lane change determinator 112 may determine whether or not the rear vehicle 30 travels in the same lane as a subject vehicle 10.

When the rear vehicle 30 travels in a lane different from a lane of the vehicle 10, the rear vehicle lane change determinator 112 may determine whether or not the rear vehicle 30 changes a travel lane thereof to the travel lane of the vehicle 10.

The rear vehicle lane change determinator 112 may determine lane change based on direction indicator information of the rear vehicle 30. In addition, the rear vehicle lane change determinator 112 may determine whether or not the rear vehicle 30 performs lane change, based on information as to a distance between the vehicle 10 and the rear vehicle 30. Lane change of the rear vehicle 30 will be described later in detail with reference to FIG. 3.

The collision possibility determinator 113 may determine a time $T_1$ required for prevention of collision with the rear vehicle 30, for determination of a collision possibility.

In this case, the requirement time $T_1$ for collision prevention may be determined in accordance with a speed $V_a$ of the vehicle 10.

The requirement time $T_1$ for collision prevention may be inversely proportional to the speed $V_a$ of the vehicle 10, as expressed in the following Expression 1.

$$T_1 = (V_a)/C \qquad \text{[Expression 1]}$$

Here, "$V_a$" represents a speed of the vehicle 10, "C" represents a constant, and the constant C may be a value determined through a vehicle test.

Meanwhile, the collision possibility determinator 113 may calculate a time-to-collision $T_2$.

In accordance with one form, when the vehicle 10 and the rear vehicle 30 travel in the same lane, the time-to-collision $T_2$ may be calculated, as expressed in the following Expression 2.

$$T_2 = \iota/(V_a - V_b) \quad \text{[Expression 2]}$$

Here, "$\iota$" represents a distance between the vehicle 10 and the rear vehicle 30, "$V_a$" represents a speed of the vehicle 10, and "$V_b$" represents a speed of the rear vehicle 30.

That is, the collision possibility determinator 113 may calculate the time-to-collision $T_2$ based on a value obtained by dividing the distance L between the vehicle 10 and the rear vehicle 30 by a relative speed ($V_a - V_b$) between the vehicle 10 and the rear vehicle 30.

In accordance with one form, when the vehicle 10 and the rear vehicle 30 travel in different lanes, the time-to-collision $T_2$ may be calculated, as expressed in the following Expression 3.

$$T_2 = \iota/\sqrt{(V_{ax} - V_{bx})^2 - (V_{ay} - V_{by})^2} \quad \text{[Expression 3]}$$

Here, "$\iota$" represents a distance between the vehicle 10 and the rear vehicle 30, "$V_{ax}$" represents a speed of the vehicle 10 in a direction x, "$V_{ay}$" represents a speed of the vehicle 10 in a direction y, "$V_{bx}$" represents a speed of the rear vehicle 30 in the direction x, and "$V_{by}$" represents a speed of the rear vehicle 30 in the direction y. The travel lane of the vehicle 10 may be defined as the direction y, and the direction perpendicular to the travel lane may be defined as the direction y.

That is, the collision possibility determinator 113 may calculate the time-to-collision $T_2$ based on a value obtained by dividing the distance $\iota$ between the vehicle 10 and the rear vehicle 30 by a relative speed ($\sqrt{(V_{ax} - V_{bx})^2 - (V_{ay} - V_{by})^2}$) between the vehicle 10 and the rear vehicle 30.

In addition, the collision possibility determinator 113 may determine a collision possibility based on the requirement time $T_1$ for collision prevention and the time-to-collision $T_2$. That is, when the requirement time $T_1$ for collision prevention is shorter than the time-to-collision $T_2$, the collision possibility determinator 113 may determine that the vehicle 10 may have a collision possibility with the rear vehicle 30.

The front vehicle presence determinator 114 may determine whether or not the vehicle 10 travels at a travel speed $V_a$ in order to prevent collision thereof with the front vehicle 20, when a travel speed $V_f$ of the front vehicle 20 is reduced to be lower than a predetermined cruise speed $V_{a'}$ under the condition that the predetermined cruise speed $V_{a'}$ is set to be higher than the travel speed $V_a$.

In accordance with one form, the front vehicle presence determinator 114 may determine whether speed control of the vehicle 10 is in an ON state or in an OFF state.

In addition, the front vehicle presence determinator 114 may determine whether or not a distance $d_1$ between the vehicle 10 and the front vehicle 20 is maintained in order to prevent collision of the vehicle 10 with the front vehicle 20. Here, the distance $d_1$ between the vehicle 10 and the front vehicle 20 may be a distance set by the driver.

In accordance with another form, the front vehicle presence determinator 114 may determine whether distance control of the vehicle 10 is in an ON state or in an OFF state.

The controller 120 may include a target distance calculator 121 and a target speed calculator 122.

The target distance calculator 121 of the controller 120 may calculate a target distance from the front vehicle 20.

The target distance may correspond to the distance $d_1$ between the vehicle 10 and the front vehicle 20 reduced until the requirement time $T_1$ for collision prevention becomes equal to or greater than the time-to-collision $T_2$. In this case, a decrement of the distance $d_1$ between the vehicle 10 and the front vehicle 20 may be an increment of the distance $\iota$ between the vehicle 10 and the rear vehicle 30.

Accordingly, the target distance calculator 121 may calculate a distance decrement $\Delta d_1$ between the vehicle 10 and the front vehicle 20, as expressed by the following Expression 4.

$$\Delta d_1 = T_1(V_a - V_b) - \iota \quad \text{[Expression 4]}$$

Here, "$T_1$" represents a requirement time for collision prevention, "$V_a$" represents a speed of the vehicle 10, "$V_b$" represents a speed of the rear vehicle 30, and "$\iota$" represents a distance between the vehicle 10 and the rear vehicle 30.

That is, the controller 120 may calculate, as the target distance of the vehicle 10, a difference between the distance $d_1$ between the vehicle 10 and the front vehicle 20 and the distance decrement $\Delta d_1$ between the vehicle 10 and the front vehicle 20. Thereafter, the controller 120 may control the vehicle 10 such that the distance between the vehicle 10 and the front vehicle 20 becomes the target distance.

The target speed calculator 122 of the controller 120 may calculate a target speed of the vehicle 10. The target speed corresponds to the speed $V_a$ of the vehicle 10 increased until the requirement time $T_1$ for collision prevention becomes equal to or greater than the time-to-collision $T_2$.

Accordingly, the target speed calculator 122 may calculate a speed increment $\Delta V_a$ of the vehicle 10, as expressed by the following Expression 5.

$$\Delta V_a = (T_1/\iota) + (V_a - V_b) \quad \text{[Expression 5]}$$

Here, "$T_1$" represents a requirement time for collision prevention, "$V_a$" represents a speed of the vehicle 10, and "$V_b$" represents a speed of the rear vehicle 30, and "$\iota$" represents a distance between the vehicle 10 and the rear vehicle 30.

That is, the controller 120 may calculate, as the target speed of the vehicle 10, a sum of the speed $V_a$ of the vehicle 10 and the speed increment $\Delta V_a$ of the vehicle 10. Thereafter, the controller 120 may control the vehicle 10 to travel at the target speed.

Figure 2:
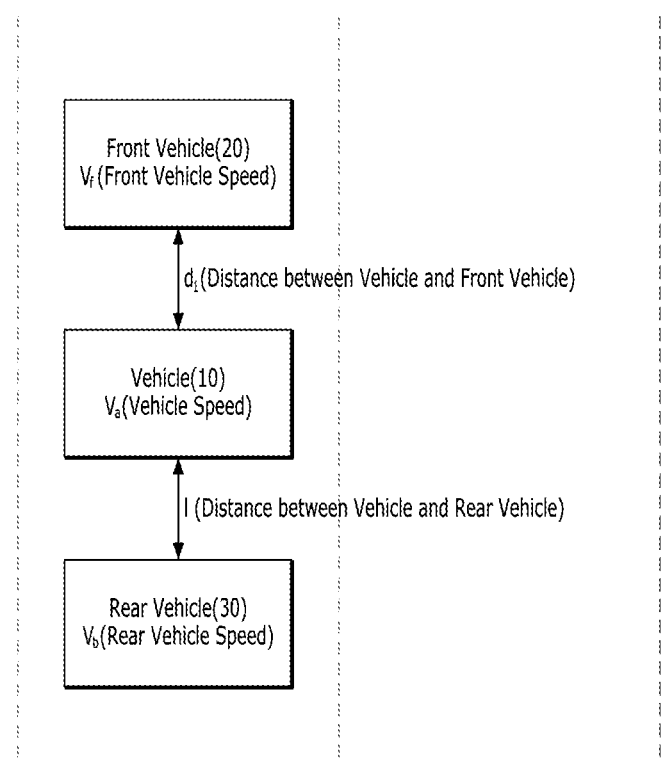
FIGS. 2 and 3 are views respectively illustrating a collision possibility determination situation according to one form of the present disclosure.
Figure 3:
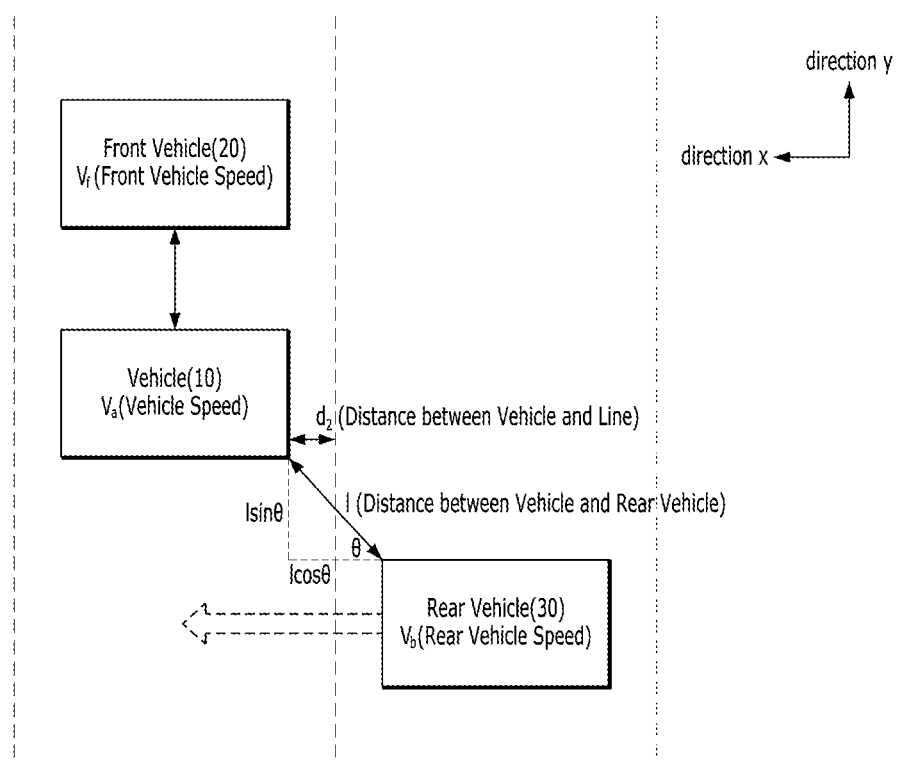

FIGS. 2 and 3 are views illustrating a collision possibility determination situation according to one form of the present disclosure.

Referring to FIG. 2, all of the front vehicle 20, the vehicle 10, and the rear vehicle 30 travel in the same lane.

When the vehicle 10 senses the rear vehicle 30 during smart cruise driving, the vehicle 10 may determine a collision possibility based on respective speeds of the vehicle 10 and the rear vehicle 30 and the distance between the vehicle 10 and the rear vehicle 30.

For this determination, the vehicle 10 may calculate a requirement time $T_1$ for collision prevention and a time-to-collision $T_2$.

In this case, the time-to-collision $T_2$ may be calculated by dividing a distance $\iota$ between the vehicle 10 and the rear vehicle 30 by a relative speed between the vehicle 10 and the rear vehicle 30.

Since all of the front vehicle 20, the vehicle 10, and the rear vehicle 30 travel in the same lane in this case, the relative speed may be a difference between a speed $V_a$ of the vehicle 10 and a speed $V_b$ of the rear vehicle 30.

When the requirement time $T_1$ for collision prevention is greater than the time-to-collision $T_2$, the vehicle 10 may then determine that there is a collision possibility.

Referring to FIG. 3, the front vehicle 20 and the vehicle 10 travel in the same lane, and the rear vehicle 30 travels in a lane different from the lane of the vehicle 10.

When the vehicle 10 senses, during smart cruise driving, that a direction indicator of the rear vehicle 30 traveling in the different lane turns on to indicate a direction toward the travel lane of the vehicle 10, the vehicle 10 may determine that the rear vehicle 30 performs lane change.

Meanwhile, the vehicle 10 may determine, during smart cruise driving, that the rear vehicle 30 traveling in the different lane performs lane change, when an x-directional value $\iota \cos \theta$ calculated based on a distance $\iota$ and an angle $\theta$ between the rear vehicle 30 and the vehicle 10 is smaller than a distance $d_2$ between the vehicle 10 and a boundary line between the lane of the vehicle 10 and the lane of the rear vehicle 30. In this case, the direction of the lanes may be a direction y, and the direction perpendicular to the lane direction may be a direction x.

When the vehicle 10 determines that the rear vehicle 30 performs lane change, the vehicle 10 may determine a collision possibility.

For this determination, the vehicle 10 may calculate a requirement time $T_1$ for collision prevention and a time-to-collision $T_2$.

In this case, the time-to-collision $T_2$ may be calculated by dividing a distance $\iota$ between the vehicle 10 and the rear vehicle 30 by a relative speed between the vehicle 10 and the rear vehicle 30.

Since the vehicle 10 and the rear vehicle 30 travel in different lanes in this case, the relative speed may be calculated based on an x-directional speed $V_{ax}$ of the vehicle 10, a y-directional speed $V_{ay}$ of the vehicle 10, an x-directional speed $V_{bx}$ of the rear vehicle 30, and a y-directional speed $V_{by}$ of the rear vehicle 30.

When the requirement time $T_1$ for collision prevention is greater than the time-to-collision $T_2$, the vehicle 10 may then determine that there is a collision possibility.

Figure 4:
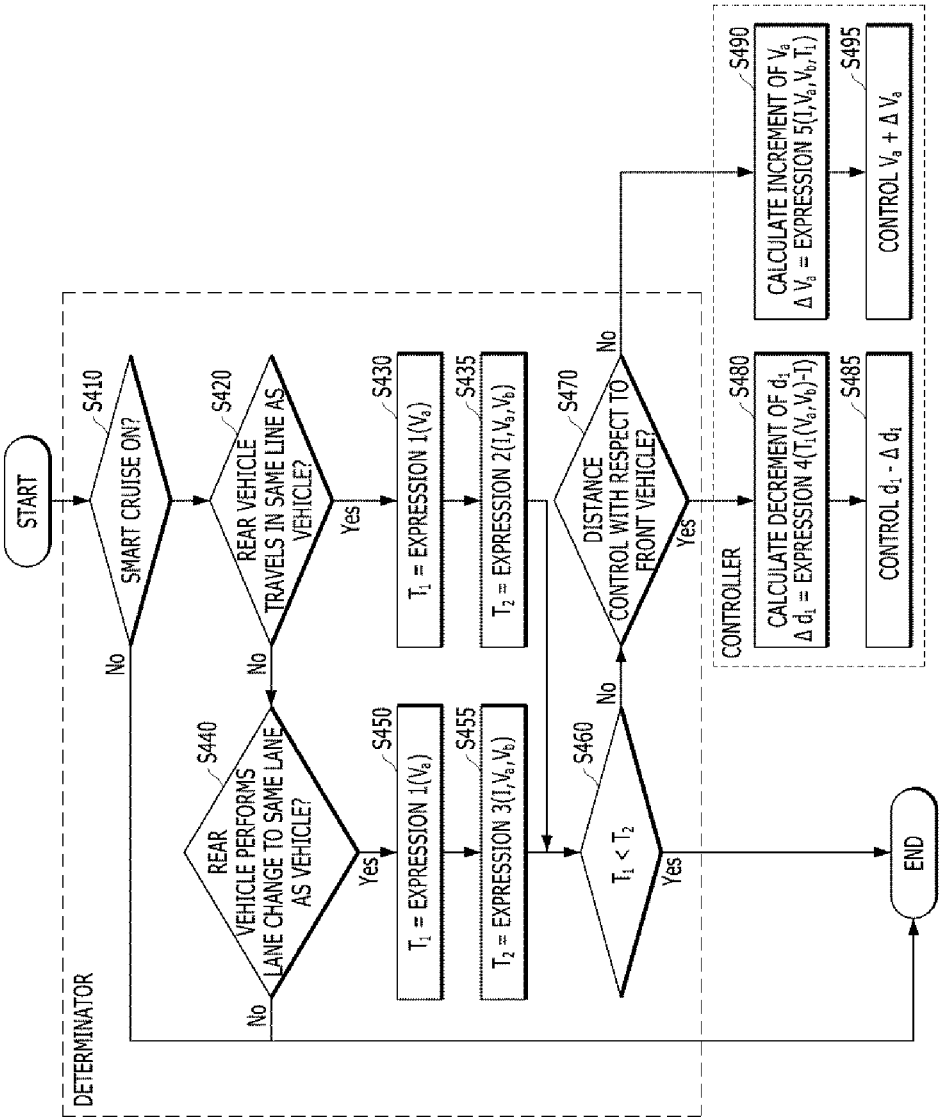
FIG. 4 is a flowchart illustrating a method for controlling vehicle driving in accordance with another form of the present disclosure.

FIG. 4 is a flowchart illustrating a method for controlling vehicle driving in accordance with one form of the present disclosure.

Referring to FIG. 4, the determinator 110 of the vehicle driving control apparatus may determine whether or not a smart cruise function is in an ON state (S410).

When the smart cruise function of the vehicle 10 is not in an ON state ("NO" in S410), the process of the vehicle driving control apparatus 100 may be ended.

When the smart cruise function of the vehicle 10 is in an ON state ("YES" in S410), the determinator 110 may determine whether or not the rear vehicle 30 travels in the same lane as the vehicle 10 (S420).

When the rear vehicle 30 travels in the same lane as the vehicle 10 ("YES" in S420), the determinator 110 may calculate a requirement time $T_1$ for collision prevention based on a speed $V_a$ of the vehicle 10 (S430).

After execution of step S430, the determinator 110 may calculate a time-to-collision $T_2$ through Expression 2 based on a distance $\iota$ between the vehicle 10 and the rear vehicle 30, the speed $V_a$ of the vehicle 10, and a speed $V_b$ of the rear vehicle 30 (S435).

On the other hand, when the rear vehicle 30 travels in a lane different from the lane of the vehicle 10 ("NO" in S420), the determinator 110 may determine whether or not the rear vehicle 30 performs lane change to the travel lane of the vehicle 10 (S440).

When the rear vehicle 30 performs lane change ("YES" in S440), the determinator 110 may calculate a requirement time $T_1$ for collision prevention based on the speed $V_a$ of the vehicle 10 (S450).

After execution of step S450, the determinator 110 may calculate a time-to-collision $T_2$ through Expression 3 based on the distance L between the vehicle 10 and the rear vehicle 30, the speed $V_a$ of the vehicle 10, and the speed $V_b$ of the rear vehicle 30 (S455).

After execution of step S430 or S450, the determinator 110 may determine whether or not the requirement time $T_1$ for collision prevention is shorter than the time-to-collision $T_2$ (S460).

When the requirement time $T_1$ for collision prevention is not shorter than the time-to-collision $T_2$ ("NO" in S460), the determinator 110 may determine whether or not the vehicle 10 performs distance control with respect to the front vehicle 20 (S470).

When the vehicle 10 performs distance control with respect to the front vehicle 20 ("YES" in S470), the controller 120 may calculate a distance decrement $\Delta d_1$ between the vehicle 10 and the front vehicle 20 (S480). In this case, the distance decrement $\Delta d_1$ between the vehicle 10 and the front vehicle 20 may be calculated through Expression 4 based on the requirement time $T_1$ for collision prevention, the speed $V_a$ of the vehicle 10, the speed $V_b$ of the rear vehicle 30, and the distance L between the vehicle 10 and the rear vehicle 30.

After execution of step S480, the controller 120 may calculate, as a target distance of the vehicle 10, a difference between a distance $d_1$ between the vehicle 10 and the front vehicle 20 and the distance decrement $\Delta d_1$ between the vehicle 10 and the front vehicle 20. The controller 120 may control the vehicle 10 based on the calculated target distance (S485). Thereafter, step S420 may be executed again.

On the other hand, when the vehicle 10 does not perform distance control with respect to the front vehicle 20 ("NO" in S470), the controller 120 may calculate a speed increment $\Delta V_a$ of the vehicle 10 (S490). In this case, the speed increment $\Delta V_a$ of the vehicle 10 may be calculated through Expression 5 based on the requirement time $T_1$ for collision prevention, the speed $V_a$ of the vehicle 10, the speed $V_b$ of the rear vehicle 30, and the distance $\iota$ between the vehicle 10 and the rear vehicle 30.

After execution of step S490, the controller 120 may calculate, as a target speed of the vehicle 10, a sum of the speed $V_a$ of the vehicle 10 and the speed increment $\Delta V_a$ of the vehicle 10. The controller 120 may control the vehicle 10 based on the target speed. Thereafter, step S420 may be executed again.

On the other hand, when the requirement time $T_1$ for collision prevention is shorter than the time-to-collision $T_2$ ("YES" in S460), the process of the vehicle driving control apparatus 100 may be ended.

The method according to the illustrated form may be composed as a program to be executed in a computer, and may be stored in a recording medium that can be read by a computer. Examples of the recording medium that can be read by a computer may include a read only memory (ROM), a random access memory (RAM), a CD-ROM, a magnetic tape, a floppy disk, an optical data storage, etc. The computer-readable recording medium is distributed to computer systems connected over a network, and computer-readable code may be stored and executed in a distributed manner. Furthermore, a functional program, code, and code segments for implementing the above-described method may be easily inferred by programmers in the technical field to which the form pertains.

As apparent from the above description, in accordance with the present disclosure, it may be possible to prevent occurrence of an accident caused by a vehicle performing lane change in rear of a subject vehicle during smart cruise driving of the subject vehicle.

In addition, in accordance with the present disclosure, it may be possible to provide, to the driver of a subject vehicle, stability capable of coping with variation in driving environment caused by surrounding vehicles during smart cruise driving of the subject vehicle.

It will be appreciated by persons skilled in the art that the effects that can be achieved through the present disclosure are not limited to what has been particularly described hereinabove and other advantages of the present disclosure will be more clearly understood from the above detailed description. It will be apparent to those skilled in the art that various modifications and variations can be made in the present disclosure without departing from the spirit or scope of the present disclosure. Thus, it is intended that the present disclosure cover the modifications and variations of this present disclosure provided they come within the scope of the appended claims and their equivalents.

What is claimed is:

1. A method for controlling driving of a vehicle, the method comprising:
   determining, by a determinator, whether smart cruise driving of the vehicle is performed;
   determining, by the determinator, whether a rear vehicle performs a lane change when the vehicle is in a smart cruise driving state;
   determining, by the determinator, a collision possibility based on whether the rear vehicle performs the lane change;
   determining, by the determinator, whether a front vehicle is present based on the determined collision possibility;
   calculating, by a controller, a target distance or a target speed when the front vehicle is present; and
   controlling, by the controller, the vehicle based on the target distance or the target speed,
   wherein determining the collision possibility comprises:
      when the rear vehicle travels in a lane different from a travel lane of the vehicle, calculating a time-to-collision of the vehicle with the rear vehicle, based on a distance between the vehicle and the rear vehicle, a speed of the vehicle in a direction x, a speed of the vehicle in a direction y, a speed of the rear vehicle in the direction x and a speed of the rear vehicle in the direction y, including calculating the time-to-collision as:

$$T_2 = \iota / \sqrt{(V_{ax} - V_{bx})^2 - (V_{ay} - V_{by})^2},$$

where "ι" represents the distance between the vehicle and the rear vehicle, "$V_{ax}$" represents the speed of the vehicle in the direction x, "$V_{ay}$" represents the speed of the vehicle in the direction y, "$V_{bx}$" represents the speed of the rear vehicle in the direction x, and "$V_{by}$" represents the speed of the rear vehicle in the direction y, and
      determining the collision possibility based on the time-to-collision of the vehicle with the rear vehicle.

2. The method according to claim 1, wherein determining whether the rear vehicle performs a lane change comprises:
   determining whether the rear vehicle travels in a same lane as the travel lane of the vehicle.

3. The method according to claim 2, further comprising:
   determining, by the determinator, whether the rear vehicle performs the lane change to the travel lane of the vehicle when the rear vehicle travels in the lane different from the travel lane of the vehicle.

4. The method according to claim 3, wherein determining the collision possibility comprises:
   calculating a requirement time for prevention of collision of the vehicle with the rear vehicle; and
   determining whether the requirement time for collision prevention is shorter than the time-to-collision.

5. The method according to claim 1, wherein determining whether the front vehicle is present comprises:
   determining whether a speed of the front vehicle is lower than a predetermined smart cruise speed of the vehicle; and
   determining whether the vehicle performs a distance control with respect to the front vehicle when the speed of the front vehicle is lower than the predetermined smart cruise speed of the vehicle.

6. A method for controlling driving of a vehicle, the method comprising:
   determining, by a determinator, whether smart cruise driving of the vehicle is performed;
   determining, by the determinator, whether a rear vehicle performs a lane change when the vehicle is in a smart cruise driving state;
   determining, by the determinator, a collision possibility based on whether the rear vehicle performs the lane change;
   determining, by the determinator, whether a front vehicle is present based on the determined collision possibility;
   calculating, by a controller, a target distance or a target speed when the front vehicle is present;
   controlling, by the controller, the vehicle based on the target distance or the target speed,
   wherein determining the collision possibility comprises:
      when the rear vehicle travels in a lane different from a travel lane of the vehicle, calculating a time-to-collision of the vehicle with the rear vehicle, based on a distance between the vehicle and the rear vehicle, a speed of the vehicle in a direction x, a speed of the vehicle in a direction y, a speed of the rear vehicle in the direction x and a speed of the rear vehicle in the direction y, and
      determining the collision possibility based on the time-to-collision of the vehicle with the rear vehicle;
   calculating, by the controller, a distance decrement between the vehicle and the front vehicle through the following Expression when the vehicle performs a distance control with respect to the front vehicle; and
   calculating, by the controller, a difference between a distance between the vehicle and the front vehicle and the distance decrement as the target distance of the vehicle:

$$\Delta d_1 = T_1(V_a - V_b) - \iota \qquad \text{[Expression]}$$

where "$T_1$" represents a requirement time for collision prevention, "$V_a$" represents a speed of the vehicle, "$V_b$" represents a speed of the rear vehicle, and "ι" represents the distance between the vehicle and the rear vehicle.

7. A method for controlling driving of a vehicle, the method comprising:
   determining, by a determinator, whether smart cruise driving of the vehicle is performed;

determining, by the determinator, whether a rear vehicle performs a lane change when the vehicle is in a smart cruise driving state;
determining, by the determinator, a collision possibility based on whether the rear vehicle performs the lane change;
determining, by the determinator, whether a front vehicle is present based on the determined collision possibility;
calculating, by a controller, a target distance or a target speed when the front vehicle is present;
controlling, by the controller, the vehicle based on the target distance or the target speed,
wherein determining the collision possibility comprises:
when the rear vehicle travels in a lane different from a travel lane of the vehicle, calculating a time-to-collision of the vehicle with the rear vehicle, based on a distance between the vehicle and the rear vehicle, a speed of the vehicle in a direction x, a speed of the vehicle in a direction y, a speed of the rear vehicle in the direction x and a speed of the rear vehicle in the direction y, and
determining the collision possibility based on the time-to-collision of the vehicle with the rear vehicle;
calculating, by the controller, a speed increment of the vehicle through the following Expression when the vehicle does not perform a distance control with respect to the front vehicle; and
calculating, by the controller, a sum of the speed of the vehicle and the speed increment as the target speed of the vehicle:

$$\Delta V_a = (T_1/\iota) + (V_a - V_b),\qquad\text{[Expression]}$$

where "$T_1$" represents a requirement time for collision prevention, "$V_a$" represents a speed of the vehicle, "$V_b$" represents a speed of the rear vehicle, and "$\iota$" represents the distance between the vehicle and the rear vehicle.

8. A non-transitory computer-readable recording medium on which a program for causing a computer to execute a method for controlling driving of a vehicle, the method comprising:
determining, by a determinator, whether smart cruise driving of the vehicle is performed;
determining, by the determinator, whether a rear vehicle performs a lane change when the vehicle is in a smart cruise driving state;
determining, by the determinator, a collision possibility based on whether the rear vehicle performs the lane change;
determining, by the determinator, whether a front vehicle is present based on the determined collision possibility;
calculating, by a controller, a target distance or a target speed when the front vehicle is present; and
controlling, by the controller, the vehicle based on the target distance or the target speed,
wherein determining the collision possibility comprises:
when the rear vehicle travels a lane different from a travel lane of the vehicle, calculating a time-to-collision of the vehicle with the rear vehicle, based on a distance between the vehicle and the rear vehicle, a speed of the vehicle in a direction x, a speed of the vehicle in a direction y, a speed of the rear vehicle in the direction x and a speed of the rear vehicle in the direction y, including calculating the time-to-collision as:

$$T_2 = \iota/\sqrt{(V_{ax}-V_{bx})^2 - (V_{ay}-V_{by})^2},$$

where "$\iota$" represents the distance between the vehicle and the rear vehicle, "$V_{ax}$" represents the speed of the vehicle in the direction x, "$V_{ay}$" represents the speed of the vehicle in the direction y, "$V_{bx}$" represents the speed of the rear vehicle in the direction x, and "$V_{by}$" represents the speed of the rear vehicle in the direction y, and
determining the collision possibility based on the time-to-collision of the vehicle with the rear vehicle.

9. An apparatus for controlling driving of a vehicle, the apparatus comprising:
a determinator configured to determine whether a driving control for the vehicle begins; and
a controller configured to control the vehicle based on whether the driving control begins,
wherein the determinator comprises:
a smart cruise driving determinator configured to determine whether smart cruise driving of the vehicle is performed,
a rear vehicle lane change determinator configured to determine whether a rear vehicle performs a lane change, when the vehicle is in a smart cruise driving state,
a collision possibility determinator configured to determine a collision possibility, based on whether the rear vehicle performs the lane change, and
a front vehicle presence determinator configured to determine a presence of a front vehicle, based on the determined collision possibility, and
wherein the controller comprises:
a target distance calculator configured to calculate a target distance between the vehicle and the front vehicle when the front vehicle is present, and
a target speed calculator configured to calculate a target speed of the vehicle when the front vehicle is present,
wherein the controller is configured to control the vehicle based on the target distance or the target speed, and
wherein the collision possibility determinator is configured to, when the rear vehicle travels a lane different from the travel lane of the vehicle:
calculate a time-to-collision of the vehicle with the rear vehicle, based on a distance between the vehicle and the rear vehicle, a speed of the vehicle in a direction x, a speed of the vehicle in a direction y, a speed of the rear vehicle in the direction x and a speed of the rear vehicle in the direction y, wherein the time-to-collision is calculated as:

$$T_2 = \iota/\sqrt{(V_{ax}-V_{bx})^2 - (V_{ay}-V_{by})^2},$$

where "$\iota$" represents the distance between the vehicle and the rear vehicle, "$V_{ax}$" represents the speed of the vehicle in the direction x, "$V_{ay}$" represents the speed of the vehicle in the direction y, "$V_{bx}$" represents the speed of the rear vehicle in the direction x, and "$V_{by}$" represents the speed of the rear vehicle in the direction y, and
determine the collision possibility, based on the time-to-collision of the vehicle with the rear vehicle.

10. The apparatus according to claim 9, wherein the rear vehicle lane change determinator is configured to determine whether the rear vehicle travels in a same lane as a travel lane of the vehicle.

11. The apparatus according to claim 10, wherein the rear vehicle lane change determinator is configured to determine whether the rear vehicle performs a lane change to the travel lane of the vehicle when the rear vehicle travels in the lane different from the travel lane of the vehicle.

12. The apparatus according to claim 11, wherein the collision possibility determinator is configured to:
calculate a requirement time to prevent collision of the vehicle with the rear vehicle, and
determine whether the requirement time to prevent the collision with the rear vehicle is shorter than the time-to-collision.

13. The apparatus according to claim 9, wherein the front vehicle presence determinator is configured to:
determine whether a speed of the front vehicle is lower than a predetermined smart cruise speed of the vehicle; and
determine whether the vehicle performs a distance control with respect to the front vehicle when the speed of the front vehicle is lower than the predetermined smart cruise speed of the vehicle.

14. An apparatus for controlling driving of a vehicle, the apparatus comprising:
a determinator configured to determine whether a driving control for the vehicle begins; and
a controller configured to control the vehicle based on whether the driving control begins,
wherein the determinator comprises:
a smart cruise driving determinator configured to determine whether smart cruise driving of the vehicle is performed,
a rear vehicle lane change determinator configured to determine whether a rear vehicle performs a lane change, when the vehicle is in a smart cruise driving state,
a collision possibility determinator configured to determine a collision possibility, based on whether the rear vehicle performs the lane change, and
a front vehicle presence determinator configured to determine a presence of a front vehicle, based on the determined collision possibility, and
wherein the controller comprises:
a target distance calculator configured to calculate a target distance between the vehicle and the front vehicle when the front vehicle is present, and
a target speed calculator configured to calculate a target speed of the vehicle when the front vehicle is present,
wherein the controller is configured to control the vehicle based on the target distance or the target speed, and
wherein the collision possibility determinator is configured to, when the rear vehicle travels a lane different from the travel lane of the vehicle:
calculate a time-to-collision of the vehicle with the rear vehicle, based on a distance between the vehicle and the rear vehicle, a speed of the vehicle in a direction x, a speed of the vehicle in a direction y, a speed of the rear vehicle in the direction x and a speed of the rear vehicle in the direction y, and
determine the collision possibility, based on the time-to-collision of the vehicle with the rear vehicle; and
wherein when the vehicle performs a distance control with respect to the front vehicle, the controller is configured to calculate a distance decrement between the vehicle and the front vehicle as:

$$\Delta d_1 = T_1(V_a - V_b) - \iota,$$

where "$T_1$" represents a requirement time for collision prevention, "$V_a$" represents a speed of the vehicle, "$V_b$" represents a speed of the rear vehicle, and "$\iota$" represents the distance between the vehicle and the rear vehicle, and wherein the controller is configured to calculate a difference between a distance between the vehicle and the front vehicle and the distance decrement as the target distance of the vehicle.

15. An apparatus for controlling driving of a vehicle, the apparatus comprising:
a determinator configured to determine whether a driving control for the vehicle begins; and
a controller configured to control the vehicle based on whether the driving control begins,
wherein the determinator comprises:
a smart cruise driving determinator configured to determine whether smart cruise driving of the vehicle is performed,
a rear vehicle lane change determinator configured to determine whether a rear vehicle performs a lane change, when the vehicle is in a smart cruise driving state,
a collision possibility determinator configured to determine a collision possibility, based on whether the rear vehicle performs the lane change, and
a front vehicle presence determinator configured to determine a presence of a front vehicle, based on the determined collision possibility, and
wherein the controller comprises:
a target distance calculator configured to calculate a target distance between the vehicle and the front vehicle when the front vehicle is present, and
a target speed calculator configured to calculate a target speed of the vehicle when the front vehicle is present,
wherein the controller is configured to control the vehicle based on the target distance or the target speed, and
wherein the collision possibility determinator is configured to, when the rear vehicle travels a lane different from the travel lane of the vehicle:
calculate a time-to-collision of the vehicle with the rear vehicle, based on a distance between the vehicle and the rear vehicle, a speed of the vehicle in a direction x, a speed of the vehicle in a direction y, a speed of the rear vehicle in the direction x and a speed of the rear vehicle in the direction y, and
determine the collision possibility, based on the time-to-collision of the vehicle with the rear vehicle; and
wherein when the vehicle does not perform the distance control with respect to the front vehicle, the controller is configured to calculate a speed increment of the vehicle as:

$$\Delta V_a = (T_1/\iota) + (V_a - V_b),$$

where "$T_1$" represents a requirement time for collision prevention, "$V_a$" represents a speed of the vehicle, "$V_b$" represents a speed of the rear vehicle, and "$\iota$" represents the distance between the vehicle and the rear vehicle, and
wherein the controller is configured to calculate a sum of the speed of the vehicle and the speed increment as the target speed of the vehicle.

16. A vehicle comprising an apparatus for controlling driving of the vehicle, the apparatus comprising:
a determinator configured to determine whether a driving control for the vehicle begins; and
a controller configured to control the vehicle based on whether the driving control begins,
wherein the determinator comprises:

a smart cruise driving determinator configured to determine whether smart cruise driving of the vehicle is performed, a rear vehicle lane change determinator configured to determine whether a rear vehicle performs a lane change, when the vehicle is in a smart cruise driving state, a collision possibility determinator configured to determine a collision possibility, based on whether the rear vehicle performs the lane change, and a front vehicle presence determinator configured to determine a presence of a front vehicle, based on the determined collision possibility, and wherein the controller comprises:

a target distance calculator configured to calculate a target distance between the vehicle and the front vehicle when the front vehicle is present, and a target speed calculator configured to calculate a target speed of the vehicle when the front vehicle is present, wherein the controller configured to control the vehicle based on the target distance or the target speed, and wherein, the collision possibility determinator is configured to, when the rear vehicle travels a lane different from the travel lane of the vehicle:

calculate a time-to-collision of the vehicle with the rear vehicle, based on a distance between the vehicle and the rear vehicle, a speed of the vehicle in a direction x, a speed of the vehicle in a direction y, a speed of the rear vehicle in the direction x and a speed of the rear vehicle in the direction y, including calculating the time-to-collision as:

$$T_2 = \iota / \sqrt{(V_{ax} - V_{bx})^2 - (V_{ay} - V_{by})^2},$$

where "$\iota$" represents the distance between the vehicle and the rear vehicle, "$V_{ax}$" represents the speed of the vehicle in the direction x, "$V_{ay}$" represents the speed of the vehicle in the direction y, "$V_{bx}$" represents the speed of the rear vehicle in the direction x, and "$V_{by}$" represents the speed of the rear vehicle in the direction y, and determine the collision possibility, based on the time-to-collision of the vehicle with the rear vehicle.

* * * * *